(12) United States Patent
Bodet et al.

(10) Patent No.: US 8,057,585 B2
(45) Date of Patent: Nov. 15, 2011

(54) COMPRESSOR UNIT FOR A VEHICLE AIR SUSPENSION SYSTEM

(75) Inventors: Marc-Michel Bodet, Northen (DE); Ludger Frilling, Hannover (DE); Frank Meiβner, Hannover (DE)

(73) Assignee: WABCO GmbH, Hannover (DE)

( * ) Notice: Subject to any disclaimer, the term of this patent is extended or adjusted under 35 U.S.C. 154(b) by 230 days.

(21) Appl. No.: 12/386,497

(22) Filed: Apr. 16, 2009

(65) Prior Publication Data

US 2009/0261543 A1    Oct. 22, 2009

(30) Foreign Application Priority Data

Apr. 22, 2008   (DE) .......................... 10 2008 020 104

(51) Int. Cl.
*B01D 53/02* (2006.01)

(52) U.S. Cl. ......................... 96/108; 280/6.157; 417/313

(58) Field of Classification Search ............... 280/6.157; 417/313; 96/108
See application file for complete search history.

(56) References Cited

U.S. PATENT DOCUMENTS

| | | | | |
|---|---|---|---|---|
| 3,828,881 | A | * | 8/1974 | Owen ........................... 180/339 |
| 5,466,007 | A | * | 11/1995 | Smith ......................... 280/6.157 |
| 2007/0096554 | A1 | * | 5/2007 | Detlefs et al. ................. 303/127 |

* cited by examiner

*Primary Examiner* — Robert J Hill, Jr.
*Assistant Examiner* — Christopher P Jones
(74) *Attorney, Agent, or Firm* — Kramer Levin Naftalis & Frankel LLP

(57) ABSTRACT

A compressor unit for an air suspension system of a motor vehicle, having a compressor, an air dryer and a compressed-air port for delivering compressed air from the compressor to the air suspension system and for introducing compressed air from the air suspension system into the air dryer. A ventilation line is provided from the air dryer to the environment of the compressor. The ventilation line has an upwardly convex bend when the compressor unit is in installed position.

11 Claims, 3 Drawing Sheets

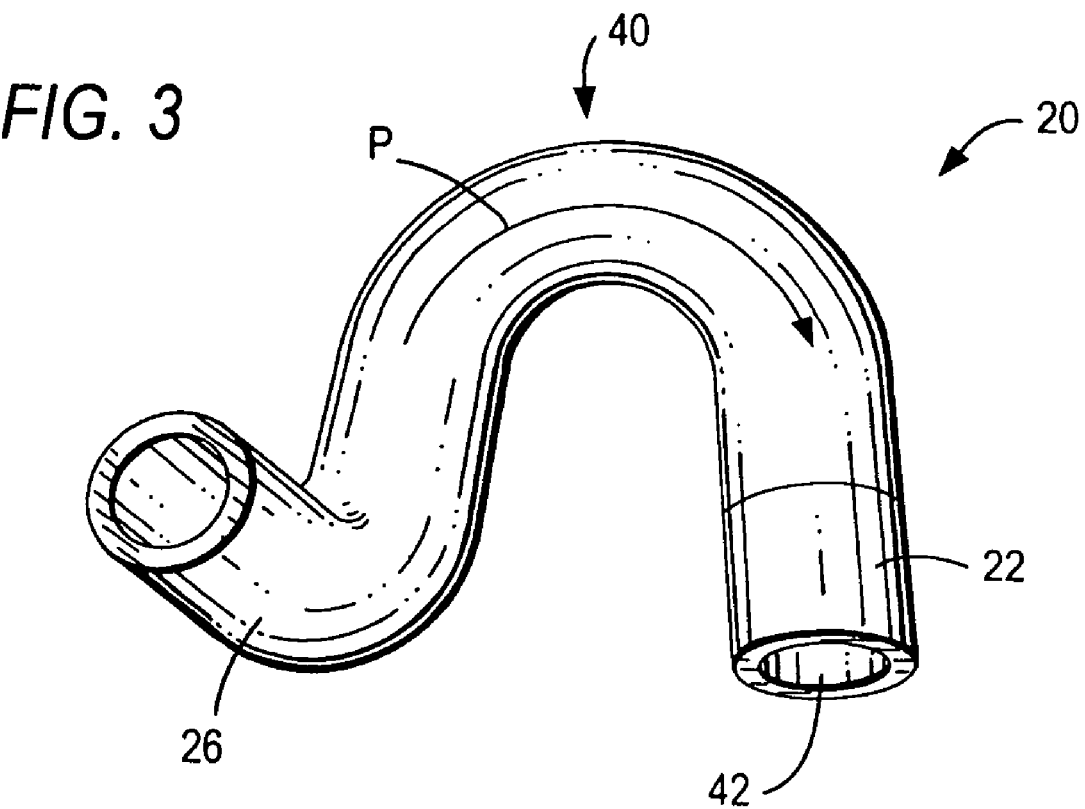
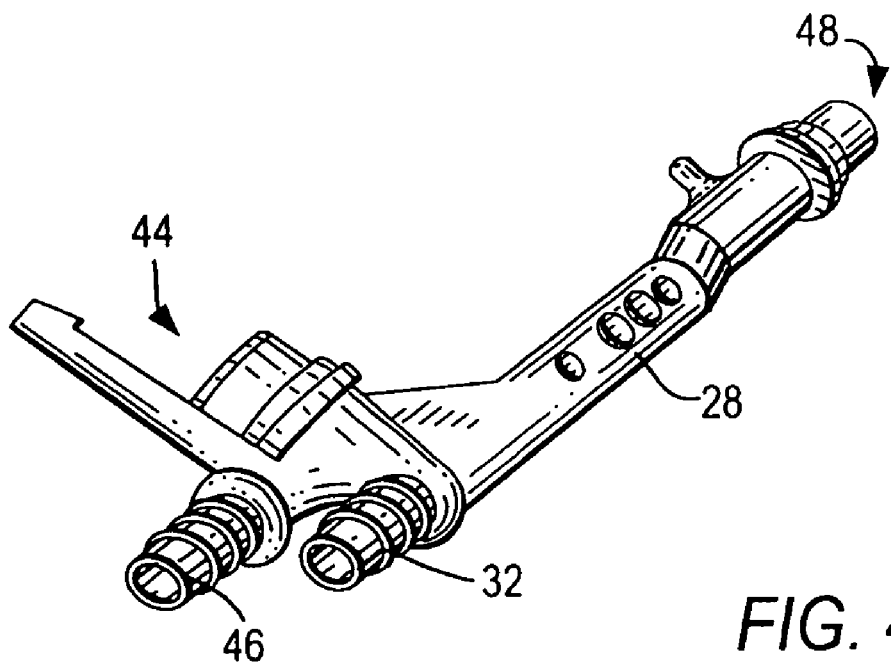

COMPRESSOR UNIT FOR A VEHICLE AIR SUSPENSION SYSTEM

FIELD OF THE INVENTION

The present invention relates generally to a compressor unit for a motor vehicle air suspension system, including a compressor, an air dryer and a compressed-air port for delivering compressed air from the compressor to the compressed air system and for returning compressed air from the air suspension system into the air dryer.

BACKGROUND OF THE INVENTION

Motor vehicle compressor units of the general type under consideration are arranged, for example, in the region of the rear axle below the vehicle's luggage compartment, and provide compressed air, for example, for a level control system of the vehicle's air suspension system. In, for example, all-terrain vehicles, which can travel through bodies of water as long as the water remains below a fording line, to prevent the air spring system with the compressor unit from icing, the compressed air must remain dry even when the vehicle is travelling through water or when the outside temperature falls. However, with conventional compressor units, instances of icing can occur in the worst case, particularly when the compressor units are used in vehicles in which only small air quantities are moved for the purpose of level control.

SUMMARY OF THE INVENTION

Generally speaking, in accordance with embodiments of the present invention, a compressor unit for a vehicle air suspension system, including a compressor, an air dryer and a compressed-air port, is provided which overcomes disadvantages associated with conventional compressor units. To reduce the tendency of the entire vehicle air spring system to ice, even under unfavorable environmental conditions, the present invention provides a compressor unit in which the ventilation line from the air dryer to the environment of the compressor has an upwardly convex bend when the compressor unit is installed.

Because of the convex bend, it is possible to dispense with the conventional long ventilation hose extending above the fording line. The convex bend ensures that, in the event of a discharge of compressed air out of the air suspension system, the air dryer is regenerated and the ejected, moist air always leaves the short ventilation hose. This is achieved even if only a small amount of air is discharged during ventilation, for example, on account of the downstream air suspension system requiring only a small amount of compressed air.

Notwithstanding the opportunity to dispense with a long ventilation hose, which extends above the fording line, downstream of the upwardly convex bend at the outflow side, the inventive construction permits the compressor unit to be arranged below the fording line of the vehicle. Specifically, if the vehicle travels through water, then the water level in the convex bend tends to rise. However, with the inventive construction, the air pressure in the convex bend increases and stops a further rise in the water level. Water is thereby prevented from passing the convex bend and passing into the air dryer. The upwardly convex bend accordingly acts as an upwardly-acting siphon.

Within the context of the present application, "an upwardly convex bend" is to be understood to mean a section of the ventilation line which substantially describes a downwardly open U-shape. In other words, in the region of the convex bend, the ventilation line is designed as an upwardly-acting siphon. The section in which the ventilation line has its convex bend may therefore also be referred to as an "inverse siphon".

The entire ventilation line has a ventilation line length of, for example, less than 20 cm. This ensures that a high proportion of moist air from the air dryer leaves the ventilation line and accumulations of moisture are prevented.

In a preferred embodiment of the present invention, the ventilation line has, downstream of the upwardly convex bend at the outflow side, an end section, and upstream of the convex bend at the outflow side, a connecting section, with the length of the end section being greater than the length of the connecting section. The recitation "at the outflow side" refers to a flow direction of air which leaves the vehicle air suspension system through the compressor unit.

Since the end section length is greater than the connecting section length, the gas volume of the end section is greater than the gas volume of the connecting section. If the vehicle travels through water and the water rises to a level above an outlet opening of the ventilation line, the water level in the ventilation line rises and compresses the air of the gas volume present in the ventilation line. If the end section gas volume is greater than the connecting section gas volume, however, the water level will rise only to the extent water penetrates into the air dryer when the vehicle is standing in water up to a level significantly above the fording line. Such a situation, however, does not arise during regular operation of the vehicle, such that an infiltration of water into the air dryer is prevented.

The dimensions of the end section length and the connecting section length are such that a rise in the ambient pressure of the compressor unit from normal pressure to 0.1 bar excess pressure as a result of the compressor unit being immersed in water has the result that the water level in the end section always remains below the convex bend and water does not pass into the connecting section.

With the end section length preferably being less than 20 cm, a very high proportion of compressed air flowing out of the air suspension system during ventilation, which compressed air flows out of the air dryer, leaves the ventilation line completely. This prevents accumulations of moisture in the ventilation line. It is expedient if the volume of the ventilation line which is arranged downstream of the air dryer at the outflow side is less than 25 cubic cm. Standing moist air in the ventilation line is thus prevented.

A compressor unit in which the air dryer is ventilated particularly effectively is obtained if a ventilation line flow resistance of an air flow from the air suspension system through the ventilation line is less than 10% of an air dryer flow resistance of the air flow through the air dryer.

The compressor unit preferably has an induction line, which is arranged upstream of the compressor at the inflow side, for drawing in air for the compressor, which induction line is separated from the ventilation line. That is, the ventilation line is separated from an induction line downstream of the air dryer at the outflow side. The induction line can, for example, lead to a point which, during regular operation of the vehicle, conducts dry air. However, since the ventilation line, on account of the presence of the convex bend, need not be designed merely as an induction line, the ventilation line can be of particularly light design. There are also no special restrictions with regard to a profile of the induction line.

According to one embodiment of the present invention, a silencer is arranged downstream of the convex bend at the outflow side. In this way, an explosive ventilation sound is prevented, as could otherwise occur in the event of an abrupt ventilation of the air suspension system. It is advantageous that the silencer can, on account of the convex bend, be arranged below the fording line of the vehicle. It is, thereby, not necessary to protect the silencer from an infiltration of water. The silencer is, however, optional.

A particularly quiet compressor unit is provided if the compressor unit has a sound-damping housing through which the ventilation line does not extend. It is advantageous that, during ventilation of the air suspension system, the sound-damping housing dampens the explosive ventilation sound to such an extent that an additional silencer is not necessary. Since the sound-damping housing can fill with water when the vehicle is travelling through a body of water, it is necessary in conventional compressor units to provide an aperture for the ventilation line. This leads to complex production of the housing and therefore of the compressor unit. In the compressor unit according to embodiments of the present invention, standing water in the sound-damping housing does not pose a problem, such that it is possible to dispense with an aperture for the ventilation line. The sound-damping housing is, however, optional.

The present invention also embodies a vehicle equipped with an air suspension system and a fording line, as well as a compressor unit according to embodiments of the present invention, which compressor unit is arranged at least partially below the fording line. The outlet opening of the ventilation line is preferably arranged below the fording line. In such case, the advantages of the compressor unit according to embodiments of the present invention are particularly pronounced, since it is possible to dispense with a ventilation line on the far side of the convex bend.

The vehicle preferably has an air suspension system which includes a level control system, wherein the level control system can act either on one or on both axles.

Accordingly, it is an object of the present invention to provide a compressor unit for a vehicle air suspension system that reduces the tendency of the entire vehicle air spring system to ice, even under unfavorable environmental conditions.

It is also an object of the present invention to provide a compressor unit that can be realized in a simple and, therefore, cost-effective manner—including, by avoiding the use of an expensive, conventional ventilation hose, which introduces undesirable additional weight.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims

BRIEF DESCRIPTION OF THE DRAWINGS

For a fuller understanding of the invention, reference is had to the following description taken in connection with the accompanying drawings in which:

FIG. 3 shows a convex bend of the compressor unit depicted in FIGS. 1 and 2; and FIG. 4 shows a branching piece of the compressor unit depicted in FIGS. 1 and 2.

DETAILED DESCRIPTION OF THE PREFERRED EMBODIMENTS

Figure 1:
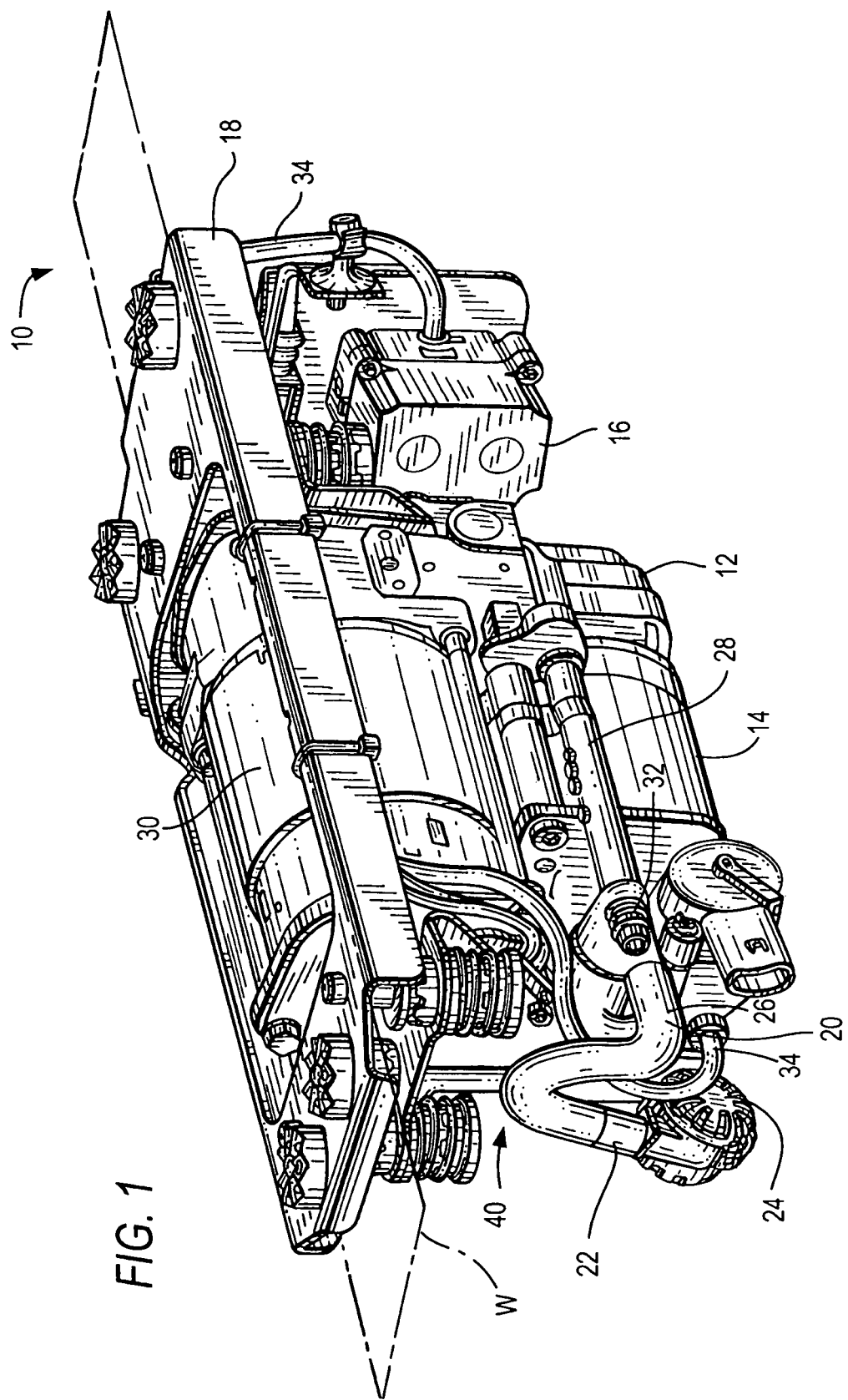
FIG. 1 is a perspective view of a compressor unit according to an embodiment of the present invention.

Referring to the drawing figures, FIG. 1 shows a compressor unit 10 according to an embodiment of the present invention. Compressor unit 10 includes a compressor 12, an air dryer 14 and a compressed-air port 16. Compressor unit 10 also has a fastener in the form of a mounting frame 18 for mounting the compressor unit on a motor vehicle (not shown).

The compressor unit 10 includes a ventilation line 20 which is connected at one end section 22 to a silencer 24, and at a connecting section 26, which faces away from end section 22, to a line separator 28 of air dryer 14. End section 22 has an end section length $L_{22}$ and an end section volume $V_{22}$ which are, in each case, greater than a connecting section length $L_{26}$ and a connecting section volume $V_{26}$ of the connecting section. Compressor 12 is driven by an electric motor 30.

In operation, air flows through an induction line (not shown) and through an induction pipe 32 into compressor 12, is compressed in the compressor and passes first via air dryer 14 and then via a pressure line 34 into compressed-air port 16. There, the compressed air is conducted onward through one or two ports 36 and 38 (FIG. 2) to an air suspension system (not shown) which includes a level control, for example for the rear axle of the vehicle.

To ventilate the air suspension system, compressed-air port 16 connects pressure line 34 to one or both of ports 36 and 38 (FIG. 2), such that the compressed air passes from the air suspension system through pressure line 34 into air dryer 14, flows around an adsorption substance there, absorbs the moisture of the adsorption substance and escapes as moist air via ventilation line 20 and silencer 24. On its path through end section 22, the emerging air passes through an upwardly convex bend 40 of ventilation line 20.

Figure 2:
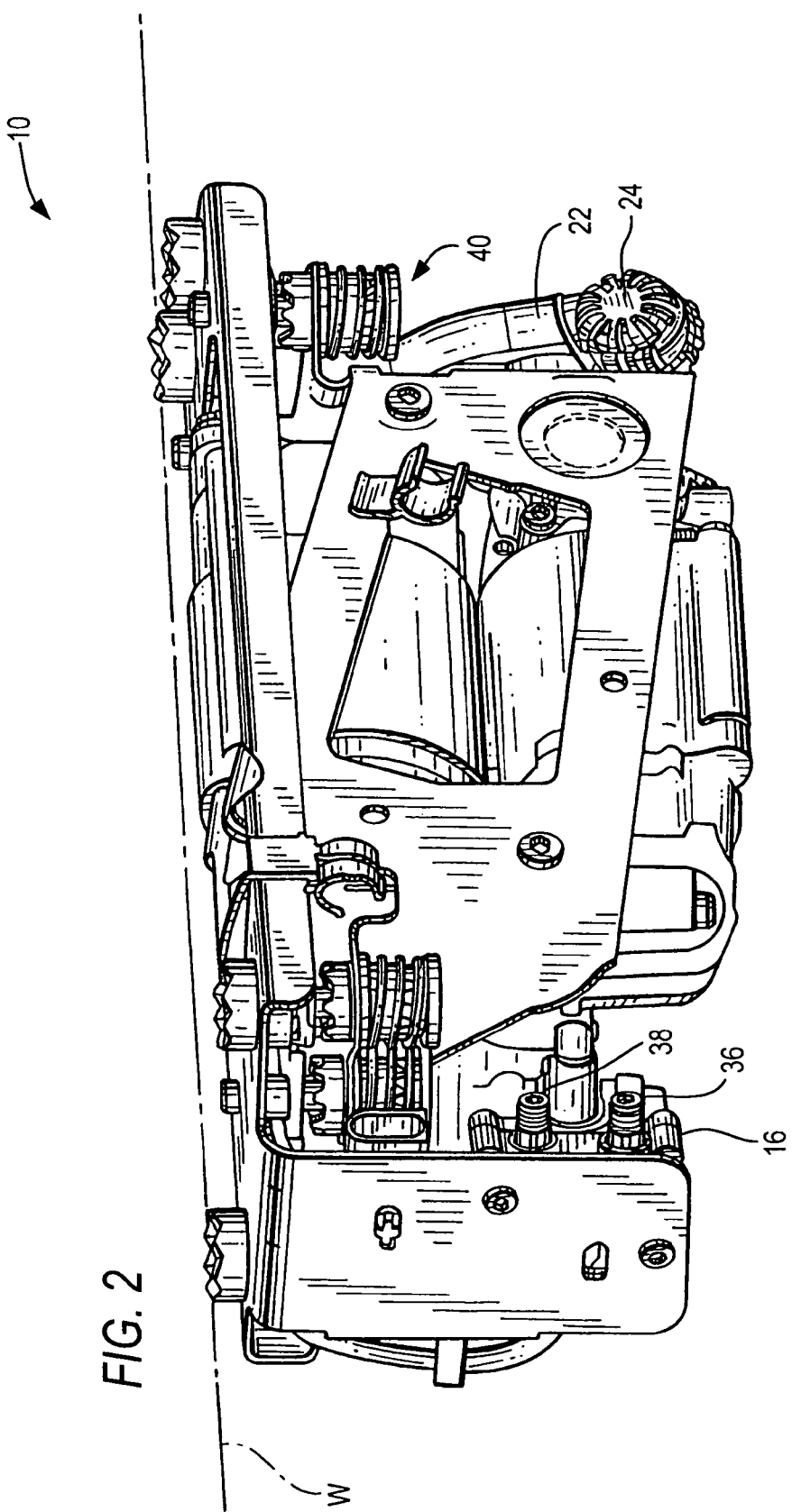
FIG. 2 is a further perspective view of the compressor unit depicted in FIG. 1.

FIG. 2 is a rear view of compressor unit 10, showing a possible fording line W of the vehicle.

FIG. 3 shows ventilation line 20 with upwardly convex bend 40 and end section 22 which opens into an outlet opening 42. It can be seen that ventilation line 20 has a substantially uniform, circular cross section. An arrow P shows the flow direction of the compressed air during ventilation.

FIG. 4 shows line separator 28 which has an air-dryer-side port 44 and a compressor-side port 48 and which has a ventilation line port 46 at the outflow side adjacent to induction pipe 32.

The compressor unit also can include a sound-damping housing (not shown) which is preferably of trough-shaped design and which ends with mounting frame 18.

If compressed air flows from the air suspension system through air dryer 14 and ventilation line 20 into atmosphere, then a ventilation line resistance $W_{20}$ and an air dryer flow resistance $W_{14}$ are selected such that more than 90% of the pressure difference falls across the air dryer.

Accordingly, the present invention provides a compressor unit for a vehicle air suspension system that reduces the tendency of the entire vehicle air spring system to ice, even under unfavorable environmental conditions. The compressor unit can be realized in a simple and, therefore, cost-effective manner.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A compressor unit of an air suspension system of a vehicle, the compressor unit comprising:
    a compressor;
    an air dryer;
    a compressed-air port for delivering compressed air from said compressor to said air suspension system and for introducing compressed air from said air suspension system into said air dryer; and
    a ventilation line from said air dryer to the environment outside of said compressor, said ventilation line having an upwardly convex bend, and wherein a top of the upwardly convex bend is disposed below a fording line of said vehicle.

2. The compressor unit according to claim 1, wherein said ventilation line has, downstream of said convex bend at an outflow side of said compressor, an end section having an end section length, and upstream of said convex bend at said outflow side, a connecting section having a connecting section length, said end section length being greater than said connecting section length.

3. The compressor unit according to claim 2, wherein said end section length is less than 20 cm.

4. The compressor unit according to claim 1, further comprising a silencer downstream of said convex bend at said outflow side.

5. The compressor according to claim 1, further comprising an induction line upstream of said air dryer at an inflow side of said compressor, for drawing in air for said compressor, said induction line being separated from said ventilation line.

6. The compressor unit according to claim 1, further comprising a sound-damping housing, said ventilation line not extending through said housing.

7. The compressor unit according to claim 1, wherein a ventilation line flow resistance of air through said ventilation line is less than ten percent of an air dryer flow resistance of air through said air dryer.

8. A vehicle, comprising an air suspension system and a fording line, said air suspension system including a compressor unit according to claim 1, said compressor unit being disposed at least partially below said fording line.

9. The vehicle according to claim 8, wherein said ventilation line includes an outlet opening disposed below said fording line.

10. The vehicle according to claim 8, wherein said air suspension system includes a level control for at least one axle of said vehicle.

11. The vehicle according to claim 8, wherein said air suspension system includes a level control for a rear axle of said vehicle.

* * * * *